A. C. HENDRICKS.
Fertilizer Attachment for Seed-Drills.

No. 224,184. Patented Feb. 3, 1880.

WITNESSES:

INVENTOR:
A. C. Hendricks
BY
ATTORNEYS.

UNITED STATES PATENT OFFICE.

ADAM C. HENDRICKS, OF DUFFIELD STATION, ASSIGNOR TO HIMSELF AND HENRY ST. JOHN SHEPHERD, OF SHEPHERDSTOWN, W. VA.

FERTILIZER ATTACHMENT FOR SEED-DRILLS.

SPECIFICATION forming part of Letters Patent No. 224,184, dated February 3, 1880.

Application filed November 12, 1879.

*To all whom it may concern:*

Be it known that I, ADAM C. HENDRICKS, of Duffield Station, in the county of Jefferson and State of West Virginia, have invented a new and Improved Fertilizing Attachment for Seed-Drills; and I do hereby declare that the following is a full, clear, and exact description of the same.

My invention is an improvement in the class of force-feed fertilizer-distributers, and while it is adapted to operate independently, it will in general be made an attachment of a seed-drill.

My improvement pertains to a rotating flanged wheel for discharging the fertilizer, and an adjustable gate co-operating therewith, for regulating the quantity of fertilizer discharged.

Figure 1:
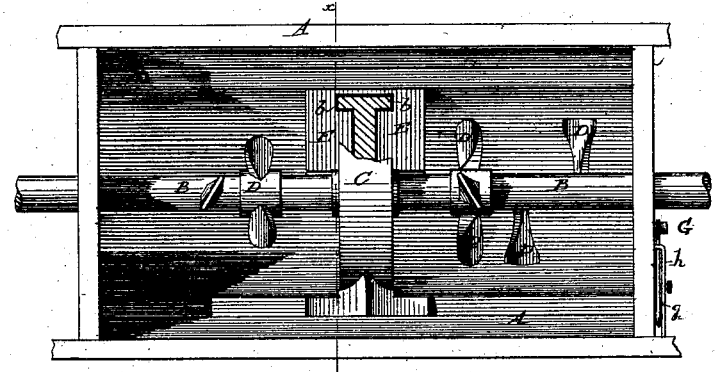
Figure 2:
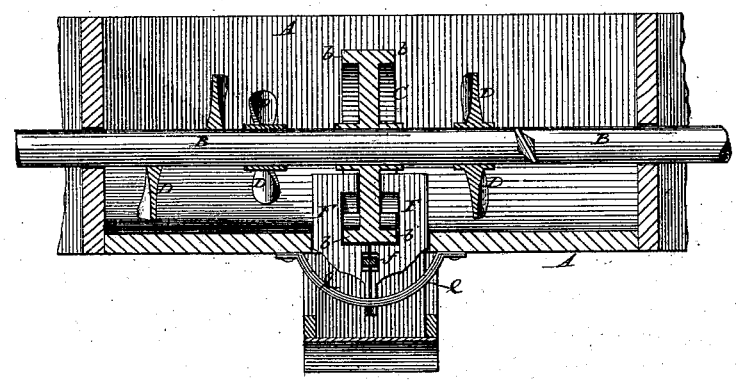
Figure 3:
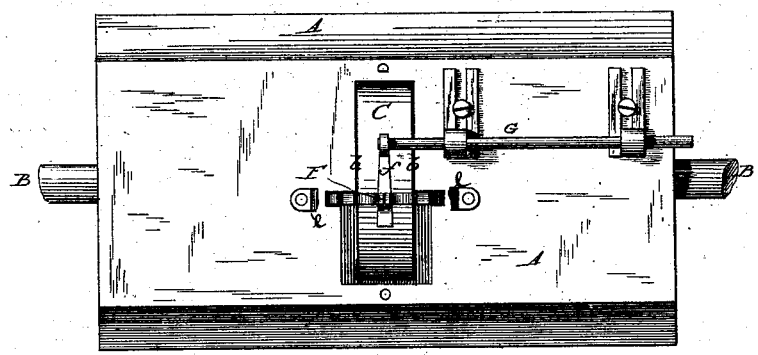
Figure 4:
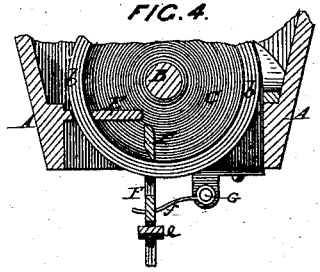

In the accompanying drawings, forming part of this specification, Figure 1 is a plan view, and Fig. 2 a central longitudinal section, of a portion of the hopper of a fertilizer-distributer. Fig. 3 is a plan view of the same inverted; and Fig. 4 is a cross-section on line *x x*, Fig. 1.

The hopper A, in which the fertilizer is deposited for being distributed, is shown detached from a seed-drill, as well as from a truck or transporting-carriage.

In practice, mechanism will also be provided for transmitting rotary motion from one of the wheels of such truck to the shaft B, which extends through the lengthwise center of the hopper A and carries a series of feed-wheels, C, and agitating and feeding arms D.

The bottom of the hopper A is slotted transversely at regular intervals to receive the periphery of the feed-wheel C. Said periphery is of such breadth relative to the thickness of the body or web of the wheel as to form an annular flange, *b*, on each side. The wheel is so placed that its periphery coincides, or nearly so, with the bottom of the hopper A. The arms or paddles D are radial to the shaft B, but set with their transverse diameter diagonal thereto, so that when the shaft is put in rotation they will move the fertilizer toward the feed-wheel C. As the wheel D revolves that portion of the fertilizer resting on the flanges *b* will move with them until it falls off by gravity or is removed by a scraper or other analogous device. In this instance I provide abutments E on each side of the wheel D, which are so constructed as to fit around the flanges thereof and serve as scrapers therefor—that is to say, the upper or horizontal portion of such abutments acts in that capacity.

The front side of the abutments E is formed of vertically-adjustable plates F, which are of L-shape, to adapt them to project over the flanges *b*, and which slide in ways formed by slots in the bottom of the hopper and by a yoke, *e*, attached to the bottom thereof.

When the gates F are closed, as shown in full lines, Fig. 4, they entirely cut off the escape of fertilizer; but when raised, as shown in Fig. 2, they allow a portion of the fertilizer resting on the flanges *b* to pass under them and be scraped off by the abutments E, so that it is discharged into the drill-tubes (not shown) and deposited in the soil.

The means I employ for raising or lowering the gates F consist of the shaft G, having radial lever-arms *f g*, one of which, *f*, connects with the lower portion of the gates, and the other, *g*, is provided with a clamp for securing it to an arc-bar, *h*, Fig. 1, for holding the gates F open.

What I claim is—

1. In a fertilizer-distributer, the combination, with the feed-wheel having lateral peripheral flanges and the fixed abutments or scrapers, of the vertically-movable gates arranged to form the front of the latter and embrace said flanges, and also work through the bottom of the hopper, as shown and described.

2. In a fertilizer-distributer, the combination of the lever-shaft having arm *f*, the vertically-sliding gates F, the flanged feed-wheel, and the hopper having a slotted bottom, as shown and described.

ADAM C. HENDRICKS.

Witnesses:
C. L. BARNHART,
J. T. HAGLEY.